United States Patent Office 3,519,715
Patented July 7, 1970

3,519,715
2α,3α-EPITHIOANDROSTANE DERIVATIVES AND PROCESS FOR PREPARING THEM
Wataru Nagata, Nishinomiya-shi, Fumikazu Mukawa, Minoo-shi, Taichiro Komeno, Osaka-shi, and Sadao Hayashi, Ashiya-shi, Japan, assignors to Shionogi & Co., Ltd., Osaka, Japan
No Drawing. Filed Apr. 22, 1968, Ser. No. 723,256
Claims priority, application Great Britain, Apr. 26, 1967, 19,248/67
Int. Cl. C07c *173/00*
U.S. Cl. 424—241
16 Claims

ABSTRACT OF THE DISCLOSURE

2α,3α-epithio-17-oxygenated-5α-androstane derivatives, substituted by an alkyl group at either positions 7α-, 7β- or 8β- having enhanced ratio of anabolic and antiestrogenic/androgenic activities, a process for preparing them and pharmaceuticals containing the compounds of the present invention.

---

The present invention relates to a new class of 2α,3α-epithiosteroids, a process for their preparation and a pharmaceutical composition thereof. More particularly, it relates to a class of 2α,3α-epithioandrostane derivatives substituted by a lower alkyl group at either positions 7α-, 7β- or 8β, represented by general formula:

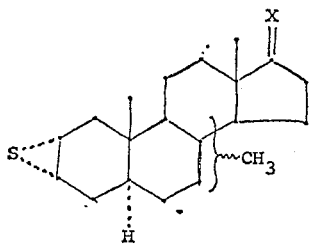

wherein X represents an oxygen atom, a ketal group or $$\begin{array}{c}OR''\\ <\\ R'\end{array}$$

in which R' represents a hydrogen atom, an alkyl group containing at most 6 carbon atoms, an alkenyl group containing at most 6 carbon atoms, or an alkynyl group containing at most 6 carbon atoms; R" represents a hydrogen atom, a hydrocarboncarboxylic acyl group containing 1–13 carbon atoms, a cycloalkyl group containing up to ten carbon atoms or a cycloalkyl group substituted by a 1'-lower alkoxy group, the total number of carbon atoms being 10 or less, and the ripple mark (∾) designates that the methyl group is in the 7α,7β or 8β configuration.

Some of the specific examples of the compound of the present invention represented by general Formula I include:

2α,3α-epithio-7α-methyl-5α-androstan-17-one,
2α,3α-epithio-7β-methyl-5α-androstan-17-one,
2α,3α-epithio-7α-methyl-5α-androstan-17β-ol,
2α,3α-epithio-7β-methyl-5α-androstan-17β-ol,
2α,3α-epithio-7α,17α-dimethyl-5α-androstan-17β-ol,
2α,3α-epithio-7β,17α-dimethyl-5α-androstan-17β-ol,
2α,3α-epithio-7α-methyl-17α-ethynyl-5α-androstan-17β-ol,
2α,3α-epithio-7β-methyl-17α-ethynyl-5α-androstan-17β-ol,
2α,3α-epithio-7α-methyl-17α-vinyl-5α-androstan-17β-ol,
2α,3α-epithio-7β-methyl-17α-vinyl-5α-androstan-17β-ol,
2α,3α-epithio-7α-methyl-17α-(1'-propnyl)-5α-androstan-17β-ol,
2α,3α-epithio-7β-methyl-17α-hexyl-5α-androstan-17β-ol,
2α,3α-epithio-8β-methyl-5α-androstan-17-one,
2α,3α-epithio-8β-methyl-5α-androstan-17β-ol,
2α,3α-epithio-8β,17α-dimethyl-5α-androstan-17β-ol,
2α,3α-epithio-8β-methyl-17α-vinyl-5α-androstan-17β-ol,
2α,3α-epithio-8β-methyl-17α-propenyl-5α-androstan-17β-ol,
2α,3α-epithio-8β-methyl-17α-ethynyl-5α-androstan-17β-ol,
and the like or their aliphatic or aromatic hydrocarboncarboxylic acid esters or their 17-cycloalkyl ether with or without 1'-alkoxy group or their dialkyl or alkyleneketal.

As for the examples of the alkyl groups represented by R' containing at most 6 carbon atoms, methyl, ethyl, propyl, isopropyl, 1-methylpropyl, butyl, pentyl, 2-methylpentyl and hexyl group, etc., may be cited. For the alkenyl groups containing at most 6 carbon atoms represented by R' vinyl, 1-propenyl, 2-propenyl, butenyl, hexenyl are examples thereof; for the alkynyl groups containing at most 6 carbon atoms, ethynyl, 1-propynyl, 2-butynyl, 2-hexynyl, etc., are examples thereof; for the hydrocarboncarboxylic acyl groups containing at most 13 carbon atoms of R", formyl, acetyl, propionyl, butyryl, valeryl, caproyl, enanthoyl, acryl, undecenoyl, trimethylacetyl, 3-trimethylpropionyl, triethylacetayl, caprylyl, cyclopropanecarbonyl, cyclobutanecarbonyl, cyclopentanecarbonyl, cyclohexanecarbonyl, cyclopentaneacetyl, cyclopentanepropionyl, cyclohexaneacetyl, cyclohexanepropionyl, cyclopentanepropionyl, phenylpropionyl, phenoxyacetyl, etc., are examples thereof; for the cycloalkyl groups (R") containing up to 10 carbon atoms with or without 1-alkoxy residue, 1-methoxycyclopentyl, 1-ethoxycyclohexyl, 1-propoxycyclohexyl, 1-methoxycyclohexyl, 1-ethoxycyclopentyl, 1-propoxycyclopentyl, 1-butoxycyclohexyl, 1 - methoxycycloheptyl, 1 - ethoxycycloheptyl, 1-ethoxy-4-methylcyclohexyl, tetrahydropyranyl, tetrahydrofuranyl groups and the like may be cited.

The present invention also provides the first process for the production of the compounds represented by the general Formula I, which comprises reacting a compound represented by the general formula:

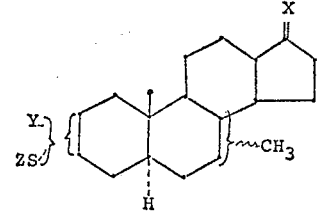

wherein X and the ripple mark have the above significances and Y represents a hydroxyl group, a halogen atom, an hydrocarboncarboxylic acyloxy group at most 8 carbon atoms, an alkanesulfonyloxy group containing at most 4 carbon atoms or an arylsulfonyloxy group containing at most 7 carbon atoms which may be substituted by inert group; Z represents a cyano group or a lower hydrocarbon carboxylic acyl group containing at most 8 carbon atoms, including thio derivatives, e.g., a lower hydrocarbonthiocarboxylic acyl group, with an organic or inorganic base.

As for the alkanesulfonyloxy group of Y in the general Formula II above, methanesulfonyloxy, ethanesulfonyloxy, propanesulfonyloxy, butanesulfonyloxy groups, etc., are examples thereof; for the arylsulfonyloxy group, benzenesulfonyloxy, phenylmethanesulfonyloxy, p-bromobenzenesulfonyloxy groups etc., are examples thereof; for the lower hydrocarboncarboxylic acyl group of Z, acetyl, propionyl, thioacetyl, methoxythioformyl, ethoxythioformyl, cyclohexanecarbonyl, etc., are examples thereof; and for a halogen atom, chlorine, bromine, iodine, etc., can be cited.

Some of the specific examples of these starting materials represented by general Formula II include:

2β-hydroxy-3α-thiocyanato-7α-methyl-5α-androstan-17-one,
2α-thiocyanato-3β-hydroxy-7β-methyl-5α-androstan-17-one,
3α-thiocyanato-7α-methyl-5α-androstane-2β-,17β-diol and its 2-acylates,
2α-thiocyanato-7α-methyl-5α-androstane-3β,17β-diol and its 3-sulfonates,
3α-acetylthio-7β-methyl-5α-androstane-2β,17β-diol and its 2-sulfonates,
3α-propionylthio-7β-methyl-5α-androstane-2β,17β-diol,
3α-thiocyanato-7α,17α-dimethyl-5α-androstane-2β,17β-diol and its 2-sulfonates or 2-carboxylic acyl esters,
3α-acetylthio-7α,17α-dimethyl-5α-androstane-2β,17β-diol and its 2-sulfonates,
2α-cyclohexylcarbonylthio-7β,17α-dimethyl-5α-androstane-3β,17β-diol and its 3-sulfonates,
3α-thiocyanato-7α-methyl-17α-ethynyl-5α-androstane-2β,17β-diol and its 2-sulfonates,
3α-acetylthio-7β-methyl-17α-ethynyl-5α-androstane-2β,17β-diol and its 2-sulfonates and 2-carboxylates,
3α-thiocyanato-7α-methyl-17α-vinyl-5α-androstane-2β,17β-diol and its 2-acylates,
2α-thiocyanato-7β-methyl-17α-vinyl-5α-androstane-3β,17β-diol and its 3-sulfonates,
3α-thiocyanato-7α-methyl-17α-(1′-propynyl)-5α-androstane-2β,17β-diol,
3α-thiocyanato-17β-methyl-17α-hexyl-5α-androstane-2β,17β-diol,
2β-hydroxy-3α-thiocyanato-8β-methyl-5α-androstan-17-one,
3α-thiocyanato-8β-methyl-5α-androstane-2β,17β-diol and its 2-sulfonates and 2-carboxylates,
3α-acetylthio-8β-methyl-5α-androstane-2β,17β-diol and its 2-sulfonates,
3α-thiocyanato-8β,17α-dimethyl-5α-androstane-2β,17β-diol,
3α-acetylthio-8α,17α-dimethyl-5α-androstane-2β,17β-diol,
3α-thiocyanato-8β-methyl-17α-propenyl-5α-androstane-3β,17β-diol,
2α-acetylthio-8β-methyl-17α-ethynyl-5α-androstane-3β,17β-diol,
3α-acetylthio-8β-methyl-17α-ethynyl-5α-androstane-2β,17β-diol,
2α-acetylthio-8β-methyl-17α-ethynyl-5α-androstane-3β,17β-diol,
3α-acetylthio-8β-methyl-17α-ethynyl-5α-androstane-2β,17β-diol, and the like and their sulfonates and carboxylates of the hydroxyl group at position 2 or 3. When the compounds have a hydroxyl group in the 17-position, the hydroxyl group may be acylated or etherized as exemplified in the explanation of the objective compound represented by general Formula I.
a compound represented by general Formula II with an organic or inorganic base to obtain the objective compounds of the present invention.

The process of the present invention may be effected, for example, by the procedure in which a compound II The process of the present invention comprises reacting is reacted with any basic reagent ranging from weak to strong base, examples of a weak base being triethylamine, alumina, sodium hydrogen carbonate, or potassium carbonate, and examples of a strong base being potassium hydroxide or sodium hydroxide, or tetramethylammonium hydroxide, in an inert solvent such as methanol, ethanol, propanol, dioxane, benzene, toluene, petroleum ether or diglyme. The reaction temperature depends on the properties of the starting material and the basic reagent, although usually 0° C. to refluxing temperature of the solvent is used. When the staring material possesses an acyloxy group at position 17, hydrolysis thereby possibly occurs. However, it can be recovered by subsequent acylation with a suitable acylating agent. When the product possesses a free hydroxyl group at position 17, it may optionally be acylated or treated with an enol ether or a dialkylketal of an alicyclic ketone to give 1-alkoxycycloalkyl ether, or with dihydropyran or dihydrofuran to give tetrahydropyranyl ether or tetrahydrofuranyl ether respectively, or with an acylating agent to give acylates as defined in the explanation of the product of this invention or with an oxidizing agent to obtain a 17-oxo compound. When the product has oxygen as the X substituent at position 17, it may be treated with an organometalic compound to obtain the 17β-hydroxy-17α-hydrocarbon compound. When the product has an acyloxy, ketal or ether group at position 17, it may be treated with an acid or a base to prepare the 17β-ol product. When the product has an unsaturated hydrocarbon group at position 17, i.e. the alkenyl or alkynyl group, it may be hydrogenated to obtain the product having the alkyl or alkenyl group respectively at position 17 of the compound.

The product of the present invention is isolated and purified by a conventional manner such as dilution with insoluble solvent, filtration, extraction, washing, drying, evaporation, chromatography, recrystallization, absorption and the like.

The compounds provided by the present invention have valuable pharmacological activities. For example, they are useful agents for regulation of physiological functions as evidenced by their antiestrogenic activity, antiuterotropic activity, uterotropic activity, estrogenic activity, implantation inhibition, myogenic activity or androgenic activity, etc. For instance, 2α,3α-epithio-7α-methyl-5α-androstan-17β-ol shows equal antiestrogenic activity, a half of myogenic activity and twenty percent of androgenic activity when compared to the reference compound, 2α,3α-epithio-5α-androstan-17β-ol. Hence, the ratio of myogenic/androgenic activity is improved up to 250%, and antiestrogenic/androgenic activity is improved up to 500%. Further, 2α,3α-epithio-8β-methyl-5α-androstan-17β-ol and its acetate show almost equal anti-estrogenic activity 16% of myogenic activity and 5% of androgenic activity when compared to 2α,3α-epithio-5α-androstan-17β-ol, one of the best known myogenic compounds. Hence, the ratio of myogenic/androgenic activity is improved up to 320%. Accordingly, these compounds are excellent agents for treatment of many cases demanding myogenic agent and antiestrogenic agent.

They may be utilized for treatment of malnutrition, recovery from emaciation, convalescence, senility, wasting diseases and disorders of nutrition, promotion of growth of immature infant, promotion of granulation and protein metabolism, increase in body weight, stimulation of appetite, acceleration of recovery from post-surgical condition, and for treatment of diseases or conditions demanding anabolic agents. They may also be utilized for treatment of mastopathy, endometriosis, regulation of conception and many other cases demanding antiestrogenic agents or other cases demanding the pharmacological activity of these compounds, in a daily dose of 1 to 500 mg. to human or veterinary or poultry uses.

The compounds of the present invention are used in human or veterinary medicine or baits solely or in combination or in preparation of a solid or liquid pharmaceutical excipient. The preparations are prepared by known methods, for example with the use of pharmaceutical organic or inorganic excipients suitable for enteral or parenteral administration. Suitable excipients are substances that do not react with the compounds of the present invention such for example as water, vegetable oils, benzyl alcohol, polyethylene glycols, gelatine, lactose, starches, magnesium stearate, talc, white petroleum jelly, isopropyl myristate or other known pharmaceutical excipients. Preparations for parenteral administration are specially made solutions and, above all, oily or aqueous solutions, furthermore, suspensions, emulsions or implants. For enteral administration there are similar preparations also containing other therapeutically useful substances. The content of the active compound in these preparations such, as of an ampoule is preferably 100γ to 500 mg., or 100 p.p.m. to 50%, if required in an unit dose.

In order that the invention may be well understood, the following examples will be given by way of illustration only, and are not intended to limit the scope of the present invention. In the following examples, CD means value of molecular rotation of circular dichroism at a wave length specified at the right foot of [θ]. Nujol is a trade name of a purified liquid paraffin.

EXAMPLE 1

(A) Into a solution of 7α-methyl-2β,3β-epoxy-5α-androstan-17β-ol (1.098 g.) in 10.0 ml. of tetrahydrofuran is added a solution of thiocyanic acid in ether the latter being, prepared from 7.0 g. of potassium thiocyanate, 6.0 ml. of phosphoric acid, 50 ml. of ether and 2.0 ml. of water. The mixture is allowed to stand over night at room temperature. The reaction mixture is poured onto ice-water and extracted with dichloromethane. The organic layer is washed with water and aqueous sodium hydrogen carbonate, dried and evaporated. The residue is recrystallized from ether to give 1.222 g. of 7α-methyl-3α-thiocyanato-5α-androstane-2β,17β-diol, M.P. 204–206° C.

IR: $\nu_{max.}^{Nujol}$ 3310, 2250 cm.$^{-1}$ (B) Into a solution of 7α-methyl-3α-thiocyanato-5α-androstane-2β,17β-diol (1.153 g.), prepared by the method described above, in 11 ml. of dioxane is added a solution of 1.3 g. of potassium carbonate in a mixture of 5.5 ml. of water and 11 ml. of methanol. The mixture is stirred over night at room temperature. The reaction mixture is poured onto ice-water and extracted with dichloromethane. The organic layer is washed with water, dried and evaporated. Recrystallization from acetone gives 0.734 g. of 7α-methyl-2α,3α-epithio-5α-androstan-17β-ol, M.P. 140–143° C. CD: [θ]$_{267}$—4680.

EXAMPLE 2

Following the procedure of Example 1B, but substituting 7α - methyl - 3α - thiocyanato - 5α - androstane - 2β,17β-diol with 7α,17α-dimethyl-3α-thiocyanato-5α-androstane-2β,17β-diol, 7α-methyl-17α-vinyl-3α-thiocyanato-5α-androstane-2β,17β-diol, 7α-methyl-17α-ethynyl-3α-thiocyanato-5α-androstane-2β,17β-diol or 7α-methyl-2β-p-toluenesulfonyloxy-3α-acetylthio-5α-androstane-17β - ol, there is obtained, 2α,3α-epithio-7α,17α-dimethyl-5α-androstan-17β - ol, 2α,3α-epithio-7α-methyl-17α-vinyl-5α-androstan-17β-ol or 2α,3α-epithio-7α-methyl-17α-ethynyl-5α-androstan-17β-ol, respectively.

EXAMPLE 3

(A) Into a solution 8β-methyl-2β,3β-epoxy-5α-androstan-17β-ol (1.10 g.) in 30 ml. of dioxane is added a solution of thiocyanic acid in ether, prepared from 7.6 g. of potassium thiocyanate, 13.48 g. of phosphoric acid, 100 ml. of ether and 10 ml. of water. The mixture is stirred for 1 hour at room temperature. The reaction mixture is poured onto ice-water and extracted with dichloromethane. The organic layer is washed with water and aqueous sodium hydrogen carbonate, dried and evaporated. The residue is recrystallized from methanol to give 1.07 g. of 8β-methyl-3α-thiocyanato-5α-androstane-2β,17β-diol, M.P. 235° C.

IR: $\nu_{max.}^{Nujol}$ 3480, 2280 cm.$^{-1}$ (B) Into a solution of 8β-methyl-3α-thiocyanato-5α-androstane-2β,17β-diol (0.50 g.), prepared by the method described above, in 5.0 ml. of dioxane is added a solution of 0.65 g. of potassium carbonate in a mixture of 2.25 ml. of water and 6.0 ml. of methanol. The mixture is stirred for 1 hour at room temperature. The reaction mixture is poured onto ice water and extracted with dichloromethane. The organic layer is washed with water, dried and evaporated. Recrystallization from ether gives 0.322 g. of 8β-methyl-2α,3α-epithio-5α-androstan-17β-ol, M.P. 136° C. CD: [θ]$_{267}$—4840.

EXAMPLE 4

Following the procedure of Example 3B, but substituting 8β - methyl - 5α - thiocyanato-5α-androstane-2β,17β-diol with 8β,17β-dimethyl-3α-thiocyanato-5α-androstane-2β,17β-diol, 8β-methyl - 17α - vinyl-3α-thiocyanato-5α-androstane-2β,17β-diol, 8β-methyl-17α-ethynyl-3α-thiocyanato-5α-androstane-2β,17β-diol, 8β - methyl - 2β -p-toluenesulfonyloxy - 3α - thiocyanato-5α-androstan-17β-ol or 2α - thiocyanato - 8β - methyl-5α-androstane-3β,17β-diol, there is obtained 2α,3α-epithio-8β,17α-dimethyl-5α-androstan-17β-ol, 2α,3α-epithio-8β-methyl - 17α - vinyl-5α-androstan - 17β - ol, 2α,3α-epithio - 8β - methyl - 17α-ethynyl-5α-androstan-17β-ol or 2α,3α-epithio-8β-methyl-5α-androstan-17β-ol, respectively.

EXAMPLE 5

(A) Into a solution of 7α-methyl-2β,3β-epoxy - 5α-androstan-17β-ol acetate (1.098 g.) in 10 ml. of tetrahydrofuran is added a solution of thiocyanic acid in ether, prepared from 7.0 g. of potassium thiocyanate, 6 ml. of phosphoric acid, 50 ml. of ether and 2 ml. of water. The mixture is allowed to stand over night at room temperature. The reaction mixture is diluted with chloroform and washed with aqueous sodium carbonate and water, dried and evaporated. Recrystallization of the residue affords 1.153 g. of 7α-methyl-3α-thiocyanato-5α-androstane-2β,17β-diol 17-acetate.

IR: $\nu_{max.}^{Nujol}$ 2269, 1728 cm.$^{-1}$ (B) Into a solution of 7α-methyl-17β-acetyloxy-3α-thiocyanato-5α-androstan-2β-ol (200 mg.) and 5 ml. of dioxane is added a solution of 20 ml. of potassium carbonate in a mixture of 3 ml. of water and 10 ml. of methanol, and left standing at room temperature over night. The reaction mixture is poured onto ice water and extracted with dichloromethane. The extract is washed with water, dried and evaporated. Recrystallization of the residue from acetone affords 187 mg. of 2α, 3α-epithio-7α-methyl-5α-androstan-17β-ol acetate, M.P. 159–161° C. CD: [θ]$_{268}$—3730.

EXAMPLE 6

(A) Into a solution of 8β-methyl-2β,3β-epoxy-5α-androstan-17β-ol acetate (0.500 g.) in 30 ml. of ether is added a solution of thiocyanic acid in ether, prepared from 3.8 g. of potassium thiocyanate, 6.74 g. of phosphoric acid, 50 ml. of ether and 3 ml. of water. The mixture is allowed to stand at room temperature overnight. The separated crystals are collected and recrystallized from ether-petroleum ether to give 0.433 g. of 8β-methyl-3α-thiocyanato - 5α - androstane-2β,17β-diol 17-acetate, M.P. 143–144° C.

IR: $\nu_{max.}^{Nujol}$ 2250, 1730 cm.$^{-1}$ (B) 8β - methyl - 17β - acetyloxy-3α-thiocyanato-5α-androstan-2β-ol (0.400 g.) in 10 ml. of dioxane is added to a solution of 50 mg. of potassium carbonate in a mixture of 5 ml. of water and 10 ml. of methanol and stirred for 10 hours at 0° C. The reaction mixture is poured onto ice-water and extracted with dichloromethane. The extract is washed with water, dried and evaporated to afford 385 mg. of residue, which is chromatographed over alumina to afford 0.326 g. of 2α,3α-epithio-8β-methyl-5α-androstan-17β-ol acetate, M.P. 145° C. CD: [θ]$_{270}$ —3730.

EXAMPLE 7

2α,3α-epithio-7α-methyl-5α-androstan - 17β - ol (200 mg.) in a mixture of 2.5 ml. of pyridine and 1.1 ml. of acetic anhydride is kept at room temperature over night and then is poured onto ice-water and extracted with dichloromethane. The extract is washed with hydrochloric acid, sodium carbonate and water, dried over sodium sulfate and evaporated. Recrystallization of the residue from acetone affords 206 mg. of 2α,3α-epithio-7α-methyl-5α-androstane-17β-ol acetate, M.P. 158–160° C.

EXAMPLE 8

2α,3α-epithio-8β-methyl - 5α - androstan - 17β - ol (24.7 mg.) in a mixture of 0.5 ml. of acetic anhydride and 0.5 ml. of pyridine is kept over night at room temperature, and then is poured onto ice-water and extracted with dichloromethane. The extract is washed with hydrochloric acid and water, dried over sodium sulfate and evaporated. Recrystallization from acetone gives 20.3 mg. of 2α,3α-epithio-8β-methyl-5α-androstan - 17β - ol acetate, M.P. 145° C.

EXAMPLE 9

Into a solution of 2α,3α - epithio - 7α - methyl-5α-androstan-17β-ol (400 mg.) in 5 ml. of tert-butanol is added a solution of 1 ml. of 1-methoxycyclohexene and 13 mg. of pyridine-p-toluenesulfonate. The solution is stirred for 4 hours at room temperature and then is poured onto ice-water, and extracted with dichloromethane. The extract is dried over sodium sulfate and evaporated to give colorless glass. Recrystallization of the residue from ether affords 2α,3α-epithio-7α-methyl-17β-(1′-methoxycyclohexyl)oxy-5α-androstane.

In a similar manner, 2α,3α-epithio-8β-methyl - 17β-(1′-ethoxycyclohexyl)oxy - 5α - androstane and 2α,3α-epithio-7α-methyl - 17β - (1′-methoxycyclopentyl)oxy-5α-androstane are prepared.

EXAMPLE 10

Into a solution of 2α,3α-epithio - 8β - methyl-5α-androstan-17β-ol (200 mg.) in 5 ml. of acetic acid is added a solution of chromium trioxide in acetic acid and left standing for 3 hours at room temperature and then is poured onto ice water. The resultant solid is collected by filtration and recrystallized from methanol to afford 183 mg. of 2α,3α-epithio-8β-methyl-5α-androstan-17-one.

EXAMPLE 11

Into a solution of 2α,3α-epithio-8β-methyl-5α-androstan-17-one (100 mg.) in 5 ml. of ether is added a solution of 50 mg. of methyl lithium in 1 ml. of ether. The solution is stirred at room temperature for 10 hours, and then is poured onto ice-water. The ether layer is separated, washed with water, dried and evaporated. Recrystallization of the residue from acetone affords 2α,3α-epithio-8β,17α-dimethyl-5α-androstan-17β-ol.

EXAMPLE 12

Into a solution of 2α,3α-epithio-8β-methyl - 5α - androstan-17-one (300 mg.) in 5 ml. of dioxane is added a solution of 300 mg. of 30% lithium acetylide in dioxane. The mixture is stirred at room temperature for 2 hours, and then is poured onto a diluted hydrochloric acid in ice-water, and extracted with ether. The organic layer is washed with water, dried and extracted with ether. Recrystallization of residue from methanol gives 2α,3α-epithio-8β-methyl-17α-ethynyl-5α-androstan-17β-ol.

EXAMPLE 17

2α,3α-epithio-17α-ethynyl - 8β - methyl - 5α - androstan-17β-ol (100 mg.) in 10 ml. of ethyl acetate is hydrogenated under atmospheric pressure at room temperature with Lindlar catalyst. After the reaction is ceased, the catalyst is removed by filtration, evaporated in vacuo to give 95 mg. of residue. Purification of the residue by chromatography and recrystallization affords 2α,3α-epithio-17α-vinyl-8β-methyl-5α-androstan-17β-ol.

What we claim is:

1. A compound of the formula

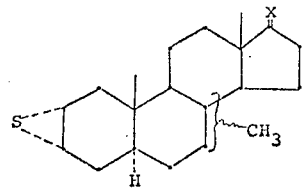

wherein:
X represents an oxygen atom, a ketal group or

in which R′ represents a hydrogen atom, an alkyl group containing 1–6 carbon atoms, an alkenyl group containing 1–6 carbon atoms or an alkynyl group containing 1–6 carbon atoms and
R″ represents a hydrogen atom, a hydrocarbon-carboxylic acyl group containing 1–13 carbon atoms, a cycloalkyl group containing up to 10 carbon atoms or a cycloalkyl group substituted by a 1′-lower alkoxy group, the total number of carbon atoms being 10 or less, and
the ripple mark ( ⁓ ) designates that the methyl is in the 7α, 7β or 8β configuration.

2. A compound as in claim 1, wherein the methyl group is in the 7α-position and X is an oxygen atom.

3. A compound as in claim 1, wherein the methyl group is in the 8β-position and X is an oxygen atom.

4. A compound as in claim 1, wherein the methyl group is in the 7α-position and X is

R′ and R″ each being a hydrogen atom.

5. A compound as in claim 1, in which the methyl group is in the 8β-position and X is

R′ and R″ each being a hydrogen atom.

6. A compound as in claim 1, wherein the methyl group is in the 7α-position and X is

R′ being a methyl group and R″ being a hydrogen atom.

7. A compound as in claim 1, wherein the methyl group is in the 8β-position and X is

R′ being a methyl group and R″ being a hydrogen atom.

8. A compound as in claim 1, wherein the methyl group is in the 7α-position and X is

R′ being a vinyl group and R″ being a hydrogen atom.

9. A compound as in claim 1, wherein the methyl group is in the 8β-position and X is

R' being a vinyl group and R" being a hydrogen atom.

10. A compound as in claim 1, wherein the methyl group is in the 7α-position and X is

R' being an ethynyl group and R" being a hydrogen atom.

11. A compound as in claim 1, wherein the methyl group is in the 8β-position and X is

R' being an ethynyl group and R" being a hydrogen atom.

12. A compound as in claim 1, wherein X is

R" being a lower hydrocarboncarboxylic acyl group.

13. A compound as in claim 1, wherein X is

R" being a 1-lower-alkoxycycloalkyl group.

14. A compound as in claim 13, wherein R" is a 1-lower-alkoxycyclopentyl group.

15. A compound as in claim 13, wherein R" is a 1-lower-alkoxycyclohexyl group.

16. A pharmaceutical composition which comprises a pharmaceutically effective amount of a compound of claim 1 in admixture with a pharmaceutical carrier.

References Cited

UNITED STATES PATENTS

| | | | |
|---|---|---|---|
| 3,301,850 | 1/1967 | Klimstra | 260—239.5 |
| 3,405,124 | 10/1968 | Klimstra | 260—239.5 |
| 3,341,523 | 9/1967 | Komeno | 260—239.5 |
| 3,422,192 | 1/1969 | Komeno | 260—239.5 |

ELBERT L. ROBERTS, Primary Examiner

U.S. Cl. X.R.

260—239.5, 239.55